(12) United States Patent
Imai et al.

(10) Patent No.: US 7,976,069 B2
(45) Date of Patent: Jul. 12, 2011

(54) ROTARY JOINT AND HOUSING SEGMENTS OF ROTARY JOINT

(75) Inventors: Hiroshi Imai, Gyoda (JP); Koichi Abe, Gyoda (JP)

(73) Assignee: Surpass Industry Co., Ltd., Gyoda-Shi, Saitama (JP)

( * ) Notice: Subject to any disclaimer, the term of this patent is extended or adjusted under 35 U.S.C. 154(b) by 761 days.

(21) Appl. No.: 11/793,610

(22) PCT Filed: Dec. 20, 2005

(86) PCT No.: PCT/JP2005/023340
§ 371 (c)(1),
(2), (4) Date: Jun. 20, 2007

(87) PCT Pub. No.: WO2006/068126
PCT Pub. Date: Jun. 29, 2006

(65) Prior Publication Data
US 2008/0113537 A1    May 15, 2008

(30) Foreign Application Priority Data
Dec. 22, 2004 (JP) .................................. 2004-371713

(51) Int. Cl.
*F16L 27/00* (2006.01)

(52) U.S. Cl. ....... 285/121.1; 285/98; 285/190; 285/273; 285/347

(58) Field of Classification Search ............... 285/98, 285/121.1, 190, 273, 276, 280–281, 347, 285/351
See application file for complete search history.

(56) References Cited

U.S. PATENT DOCUMENTS

| | | | | |
|---|---|---|---|---|
| 1,760,224 A | * | 5/1930 | Wray | 285/61 |
| 2,557,498 A | * | 6/1951 | Collender | 285/121.3 |
| 2,877,026 A | * | 3/1959 | Payne et al. | 277/365 |
| 3,077,252 A | * | 2/1963 | Treer | 192/18 A |
| 3,381,704 A | * | 5/1968 | Richardson | 137/355.17 |
| 3,411,526 A | * | 11/1968 | Schaefer | 137/312 |

(Continued)

FOREIGN PATENT DOCUMENTS
EP    0 302 632 A1    2/1989
(Continued)

OTHER PUBLICATIONS
European Search Report, dated Dec. 22, 2008 for European Application No. 05820358.9.
(Continued)

*Primary Examiner* — Aaron Dunwoody
*Assistant Examiner* — Fannie Kee
(74) *Attorney, Agent, or Firm* — Thomas & Karceski, PC (57) ABSTRACT

A rotary joint and a housing for a rotary joint include an insertion hole for receiving a rotary shaft, a plurality of housing segments arranged along the shaft, and a housing communicating hole formed in at least one of the housing segments. An annular groove permits communication between the shaft communicating hole and the housing communicating hole. An annular leakage-preventing member between the shaft and the housing blocks fluid movement in an axial direction of the shaft. The shaft includes a cylindrical shaft portion and a small-diameter portion formed at one end. At least one pair of rotating supports support the shaft and the housing. One of the rotating supports is disposed on the small-diameter portion. An outside diameter of one of the rotating supports is smaller than an outside diameter of the shaft and also is smaller than inside diameters of the plurality of housing segments.

9 Claims, 4 Drawing Sheets

U.S. PATENT DOCUMENTS

| | | |
|---|---|---|
| 3,477,746 A | 11/1969 | Watson |
| 3,853,328 A | 12/1974 | Pierce |
| 4,683,912 A * | 8/1987 | Dubrosky ............... 137/580 |
| 5,143,483 A * | 9/1992 | Petersen ............... 405/191 |
| 5,462,083 A * | 10/1995 | Kaspar ............... 137/580 |
| 5,713,609 A | 2/1998 | Mascola |
| 6,485,062 B2 * | 11/2002 | Omiya et al. ............... 285/121.1 |

FOREIGN PATENT DOCUMENTS

| | | |
|---|---|---|
| JP | 59-59572 | 4/1984 |
| JP | 59-147187 | 8/1984 |
| JP | 61-94687 | 6/1986 |
| JP | 61-286694 | 12/1986 |
| JP | 63-042762 | 2/1988 |
| JP | 2003-42306 A | 2/2003 |

OTHER PUBLICATIONS

Office Action dated Jul. 20, 2010 for Japanese Patent Application No. 2004-371713, including a Partial English Translation of the Office Action.

\* cited by examiner

ROTARY JOINT AND HOUSING SEGMENTS OF ROTARY JOINT

CROSS-REFERENCE TO RELATED APPLICATIONS

This application is a National Phase Application based upon and claiming the benefit of priority to PCT/JP2005/023340 filed on Dec. 20, 2005, which is based upon and claims the benefit of priority to Japanese Patent Application No. 2004-371713, filed Dec. 22, 2004, the contents of both of which are incorporated herein by reference.

TECHNICAL FIELD

The present invention relates to rotary joints and housing segments of rotary joints.

BACKGROUND ART

Conventionally, a surface of a semiconductor wafer is polished using a chemical mechanical polishing (CMP) apparatus by independently rotating a turntable and a top ring of the CMP apparatus with the semiconductor wafer held therebetween.

A variety of chemical solutions for polishing are fed from the turntable or the top ring to the semiconductor wafer being polished. Also, air and water used for vacuum suction of the semiconductor wafer, air spouting, or water spouting, for example, are fed from the turntable or the top ring.

The turntable and the top ring are rotatably supported by a fixed main body of the CMP apparatus. A rotary joint is disposed between the main body and the turntable or the top ring in such a manner that a variety of chemical solutions, air, and water, for example, can flow through the rotary joint without leakage.

A generally known rotary joint structure includes a cylindrical shaft and a cylindrical housing surrounding the shaft. The shaft and the housing are arranged so as to be capable of relative rotation in such a manner that a variety of chemical solutions, for example, can flow from the housing to the shaft, or from the shaft to the housing, without leakage (for example, see Patent Document 1).

Patent Document 1: U.S. Pat. No. 5,713,609

DISCLOSURE OF INVENTION

The rotary joint disclosed in Patent Document 1 mainly includes a cylindrical shaft and a housing having a hole where the shaft is inserted. The shaft and the housing are arranged so as to be capable of relative rotation about the central axis of the shaft. The housing has through-holes arranged in the central-axis direction of the shaft as flow channels. The shaft has through-holes extending in the central-axis direction of the shaft and having openings in a side surface of the shaft at positions corresponding to the through-holes of the housing. This rotary joint has flow channels formed to communicate chemical solutions, for example, between the shaft and the housing.

For the rotary joint disclosed in Patent Document 1, however, the number of flow channels formed in the shaft and the housing cannot be changed. The entire rotary joint must therefore be replaced if, for example, the number of chemical solutions used for a CMP apparatus is increased or decreased. This poses the problem of increased costs.

In addition, one to four or five chemical solutions, for example, can be used for the CMP apparatus. It is burdensome for manufacturers to produce the number of rotary joints required for all such cases and to keep them in stock.

An object of the present invention, which has been created to solve the above problems, is to provide a rotary joint and housing segments of a rotary joint which can handle the case where, for example, the number of chemical solutions used is increased or decreased at low cost and which contribute to a reduction in production costs and lead time.

To achieve the above object, the present invention provides the following solutions.

A rotary joint of the present invention includes a substantially cylindrical shaft; a shaft communicating hole formed in the shaft and having an opening in a side surface thereof; a housing having an insertion hole where the shaft is inserted so as to be capable of relative rotation; a plurality of housing segments formed by dividing the housing and arranged in a central-axis direction of the shaft; a housing communicating hole formed in each of the housing segments so that the shaft communicating hole communicates with the outside of the housing via the housing communicating hole; an annular groove formed in at least one of the side surface of the shaft and an inner circumferential surface of the insertion hole so that the shaft communicating hole communicates with the housing communicating hole via the annular groove; and an annular leakage-preventing member disposed between the shaft and the housing to block fluid movement in the central-axis direction.

According to the present invention, the number of fluids, such as chemical solutions, that can be communicated without being mixed with each other can be changed by changing the number of housing segments and replacing the shaft with one corresponding to the number of housing segments.

For example, the number of fluids can be decreased by replacing the shaft with one corresponding to the decreased number of fluids, which may be produced or ordered from a manufacturer, and removing unnecessary housing segments from the rotary joint. The number of fluids can also be increased using a shaft corresponding to the increased number of fluids and additional housing segments, which may be produced or ordered from a manufacturer.

This method can be employed at a lower cost than replacement of the entire rotary joint because the method requires only an alternative shaft, or only an alternative shaft and additional housing segments.

Because the number of fluids to be communicated is changed by changing the number of housing segments, the shapes thereof do not have to be changed. In comparison with the use of dedicated housings corresponding to the number of fluids to be communicated, the above method contributes to a simplified production process and a reduction in lead time, cost, and storage space because only housing segments of the same shapes are produced.

In the present invention, the rotary joint preferably further includes centering means disposed on opposing surfaces of two of the housing segments to align the central axes of the insertion holes formed in the two housing segments.

The centering means can be used to easily align the central axes of the insertion holes formed in the housing segments. This prevents formation of steps in the inner circumferential surface of the insertion hole due to misalignment of the housing segments, thus suppressing variations in the distance between the shaft and the insertion hole.

The use of the centering means can therefore suppress variations in the surface pressure of contact portions of the shaft and the leakage-preventing member to prevent further wear of the shaft and the leakage-preventing member. This avoids leakage of fluid communicated between the shaft communicating hole and the housing communicating hole.

In the above structure, the centering means preferably includes an annular protrusion formed about the central axis on the opposing surface of one of the two housing segments and an annular recess formed about the central axis in the opposing surface of the other housing segment and fitted to the annular protrusion.

The protrusion and the recess can be formed simultaneously when the housing segments are formed, particularly, when the insertion hole is formed. Accordingly, the central axes of the protrusion and the recess can be aligned to the central axis of the insertion hole with high accuracy, thus further suppressing variations in the distance between the shaft and the insertion hole. This prevents wear of the shaft and the leakage-preventing member and leakage of fluid communicated between the shaft communicating hole and the housing communicating hole.

Specifically, the protrusion and the recess can be formed in the same step as the formation of the insertion hole of the housing segments without detaching them from a retaining jig (chuck), thus achieving high relative positional accuracy.

It is preferred in the present invention that the housing include the plurality of housing segments, which are arranged in a line, and a fastening member integrally fastening the plurality of housing segments; each of the pair of housing segments disposed at both ends of the housing have a retaining portion retaining the fastening member; and each of the housing segments disposed between the pair of housing segments have a fastening member hole where the fastening member is inserted.

The plurality of housing segments arranged in a line can be integrally fixed and joined by fastening the plurality of housing segments disposed at both ends using the fastening member. The plurality of housing segments can therefore be easily joined and separated to change the number of fluids to be communicated.

It is preferred in the present invention that the housing include the plurality of housing segments, which are arranged in a line, and a fastening member integrally fastening the plurality of housing segments; each of the pair of housing segments disposed at both ends of the housing have a retaining portion retaining the fastening member; each of the housing segments disposed between the pair of housing segments have a fastening member hole where the fastening member is inserted; the fastening member be a bolt having a male threaded portion in at least a tip region of an end of the bolt and a head portion at the other end of the bolt; the retaining portion of one of the pair of housing segments be a retaining female threaded portion in threaded engagement with the male threaded portion; and the retaining portion of the other housing segment be a seating surface in contact with the head portion.

Because the bolt is used as the fastening member, the plurality of housing segments can be easily integrally joined by the threaded engagement of the male threaded portion of the bolt with the retaining female threaded portion of the housing segment and can be easily separated by releasing the threaded engagement.

It is preferred in the present invention that the housing include the plurality of housing segments, which are arranged in a line, and a fastening member integrally fastening the plurality of housing segments; each of the pair of housing segments disposed at both ends of the housing have a retaining portion retaining the fastening member; each of the housing segments disposed between the pair of housing segments have a fastening member hole where the fastening member is inserted; the fastening member be a bolt having a male threaded portion in at least a tip region of an end of the bolt and a head portion at the other end of the bolt; the retaining portion of one of the pair of housing segments be a retaining female threaded portion in threaded engagement with the male threaded portion; the retaining portion of the other housing segment be a seating surface in contact with the head portion; and a female threaded hole portion having an inside diameter larger than the outside diameter of the male threaded portion be formed on an inner circumferential surface of the fastening member hole.

With the above structure, for example, the plurality of housing segments can be easily separated even if they are difficult to separate after the fastening member is released. Specifically, the phases of the adjacent housing segments are shifted from each other so that the fastening member hole becomes misaligned. A predetermined bolt capable of threaded engagement with the female threaded hole portion is then screwed into the female threaded hole portion to push and separate the adjacent housing segments.

In the present invention, preferably, at least one pair of rotating supports supporting the shaft and the housing in such a manner as to be capable of relative rotation about the central axis is provided on the shaft, and one of the rotating supports is disposed at one end of the shaft and has a smaller outside diameter than the shaft.

Because the rotating supports are disposed on the shaft, the shaft and the housing can be disassembled and assembled without impairing the relative positional accuracy of the central axes of the shaft and the insertion hole.

If, for example, the rotating supports are bearings, the relative positional accuracy of the central axes of the shaft and the insertion hole can more easily be ensured in the case where outer rings of the bearings are detachable from the housing than in the case where inner rings of the bearings are detachable from the shaft. As a result, the rotating supports can suppress variations in the distance between the shaft and the insertion hole to prevent further wear of the shaft and the leakage-preventing member. This avoids leakage of fluid communicated between the shaft communicating hole and the housing communicating hole.

Specifically, the problems described below can be prevented if the outer rings of the bearings are detachable from the housing.

It is generally known that inner rings of bearings must be tightly fitted to a shaft. In this case, dedicated jigs are required to detach the bearings from the shaft and reattach the bearings to the shaft in, for example, maintenance. The above structure can prevent the problem of difficulty of on-site maintenance.

Bearings can be damaged when detached from a shaft. This poses the problem of impairing the relative positional accuracy of the central axes of the shaft and an insertion hole. The above structure can prevent such damage to avoid leakage of chemical solutions, for example, and a decrease in the service life of the rotary joint.

In maintenance of the rotary joint of the present invention, the shaft does not have to be withdrawn from the inner rings of the rotating supports. The outer ring of one of the rotating supports has a smaller outside diameter than the shaft. Accordingly, the shaft can be tightly fitted into the rotating supports. The housing and the rotating supports are loosely fitted to each other so that the housing can be detached without withdrawing the shaft from the rotating supports in the maintenance of the rotary joint.

In reassembly after maintenance, for example, the rotary joint does not require a fitting jig for retaining the inner rings of the rotating supports or operations such as reassembly of the rotating supports. This facilitates on-site maintenance.

As a result, the maintenance of the rotary joint, for example, can be performed without using jigs for attaching and detaching the rotating supports or damaging the rotating supports.

Because the rotating support disposed at one end of the shaft has a smaller outside diameter than the shaft, the leakage-preventing member can be detached from the end of the shaft. This structure eliminates the need to detach the rotating supports from the shaft when, for example, a degraded or worn leakage-preventing member is replaced or the number of housing segments is changed. This prevents impairment of the relative positional accuracy of the central axes of the shaft and the insertion hole.

In the present invention, preferably, the leakage-preventing member is fixed to the housing, and the shaft has a wear-resistant coating in at least a region of the side surface of the shaft where the leakage-preventing member slides.

The wear-resistant coating can prevent wear of the shaft when it slides over the leakage-preventing member. The coating can therefore prevent a decrease in the pressure of the contact surfaces of the shaft and the leakage-preventing member and separation of the shaft and the leakage-preventing member. This avoids leakage of fluid communicated between the shaft communicating hole and the housing communicating hole.

The wear-resistant coating is formed on the side surface of the shaft. Using the wear-resistant coating, the shaft can be more easily produced while ensuring dimensional accuracy in comparison with the use of, for example, a wear-resistant cylinder for covering the shaft. This contributes to a reduction in production costs.

It is preferred in the present invention that the leakage-preventing member be a pair of sealing members that are substantially U-shaped in cross section; the pair of sealing members be arranged in the central-axis direction with joint surfaces of the housing segments disposed therebetween such that substantially U-shaped openings face away from each other in the central-axis direction; and an annular reinforcing member be disposed between the sealing members.

The reinforcing member can support the sealing members so that they can be prevented from moving and so that they are fixed at predetermined positions. The reinforcing member can therefore stabilize contact portions of the sealing members and the shaft to prevent leakage of fluid.

The pair of sealing members could be moved if, for example, they are supported in contact with each other. In such a case, the contact portions of the sealing members and the shaft could be shifted from each other and cause leakage of fluid.

Housing segments of a rotary joint of the present invention includes a substantially cylindrical shaft; a shaft communicating hole formed in the shaft and having an opening in a side surface thereof; a housing having an insertion hole where the shaft is inserted so as to be capable of relative rotation; the plurality of housing segments, which are formed by dividing the housing; a housing communicating hole formed in each of the housing segments so that the shaft communicating hole communicates with the outside of the housing via the housing communicating hole; an annular groove formed in at least one of the side surface of the shaft and an inner circumferential surface of the insertion hole so that the shaft communicating hole communicates with the housing communicating hole via the annular groove; and an annular leakage-preventing member disposed between the shaft and the housing to block fluid movement in a central-axis direction of the shaft. The housing segments are arranged in the central-axis direction.

According to the present invention, the housing segments are arranged in the central-axis direction. Therefore, the number of fluids, such as chemical solutions, that can be communicated without being mixed with each other can be changed by changing the number of housing segments and replacing the shaft with one corresponding to the number of housing segments.

Because the number of fluids to be communicated is changed by changing the number of housing segments, the shapes thereof do not have to be changed. In comparison with the use of dedicated housings corresponding to the number of fluids to be communicated, the above method contributes to a simplified production process and a reduction in lead time, cost, and storage space because only housing segments of the same shapes are produced.

The rotary joint and the housing segments of the rotary joint according to the present invention have the advantage of low cost because the number of chemical solutions used, for example, is changed by changing the number of housing segments and replacing the shaft with one corresponding to the number of housing segments.

In addition, the rotary joint and the housing segments of the rotary joint according to the present invention have the advantage of reduced production costs and lead time because the shapes of the housing segments do not have to be changed when the number of fluids to be communicated is changed.

BEST MODE FOR CARRYING OUT THE INVENTION

A rotary joint and a CMP apparatus including the rotary joint according to an embodiment of the present invention will now be described with reference to FIGS. 1 to 5.

First, the CMP apparatus including the rotary joint of the present invention will be described.

Figure 1:
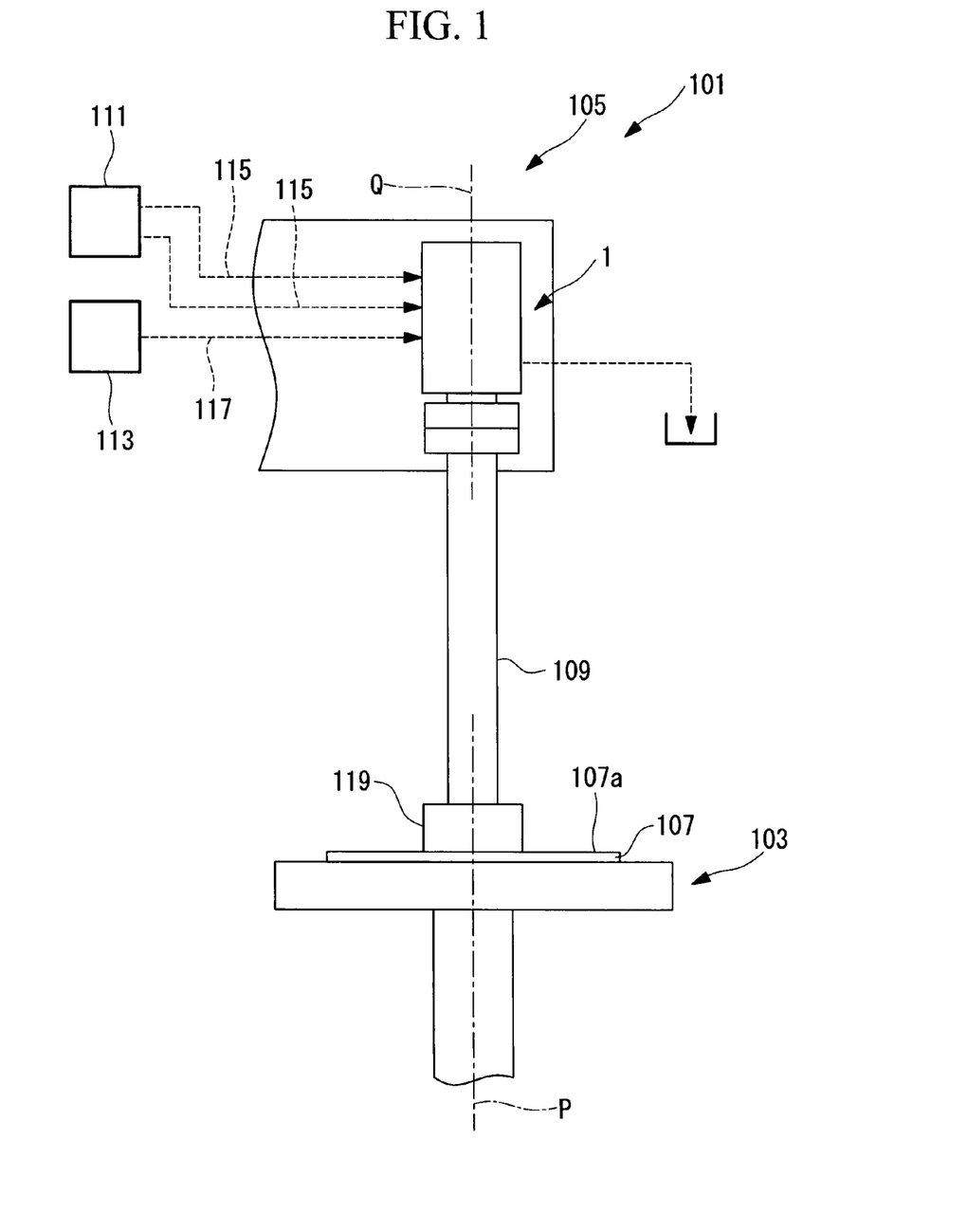
FIG. 1 is a schematic diagram of a rotary-joint-related part of a CMP apparatus including a rotary joint according to the present invention.

FIG. 1 is a schematic diagram of a part, related to the rotary joint, of the CMP apparatus including the rotary joint according to the present invention.

In FIG. 1, a CMP apparatus 101 mainly includes a turntable 103 rotatable about a substantially vertical rotation axis P and a pad-supporting section 105 that moves forward and backward (reciprocates) horizontally. A silicon wafer 107, for example, is held and polished between the turntable 103 and the pad-supporting section 105.

The pad-supporting section 105 includes a polishing pad 109 rotatable about a substantially vertical rotation axis Q, a supply and drainage unit 111 for supplying and draining polishing chemical solutions to and from the polishing pad 109, an air supply unit 113 for supplying pressurized air, and a rotary joint 1 connecting the supply and drainage unit 111 and the air supply unit 113 to the polishing pad 109 in such a manner that the polishing pad 109 is capable of relative rotation.

Supply and drainage channels 115 are formed between the supply and drainage unit 111 and the polishing pad 109 to communicate the polishing chemical solutions. An air supply channel 117 is formed between the air supply unit 113 and the polishing pad 109 to communicate pressurized air.

The polishing chemical solutions can be exemplified by a silica slurry which contains potassium hydroxide (KOH), serving as an alkali component, and to which isopropyl alcohol is added.

In the CMP apparatus 101, first, the wafer 107 is placed and held on the turntable 103 with a surface 107a of the wafer 107 facing upward. The polishing pad 109 is then moved toward the wafer 107 until a pad portion 119 of the polishing pad 109 comes into contact with the surface 107a.

Next, the polishing chemical solutions supplied from the supply and drainage unit 111 are discharged between the pad portion 119 and the wafer 107 together with pressurized air supplied from the air supply unit 113. The surface 107a of the wafer 107 is polished by moving the polishing pad 109 forward and backward (reciprocating) horizontally while rotating the polishing pad 109 or by causing the polishing pad 109 to orbit.

The pad portion 119 has a plurality of branch air channels for discharging the pressurized air onto the wafer 107. The pressurized air discharged from the branch air channels quickly and uniformly disperses the polishing chemical solutions discharged between the pad portion 119 and the wafer 107. The pressurized air also quickly drains residual chemical solutions from between the pad portion 119 and the wafer 107.

After the polishing is completed, the supply and drainage unit 111 drains residual chemical solutions from the supply and drainage channels 115 by suction to prevent the chemical solutions from dripping onto the surface 107a of the wafer 107.

Next, the rotary joint according to the present invention will be described.

Figure 2:
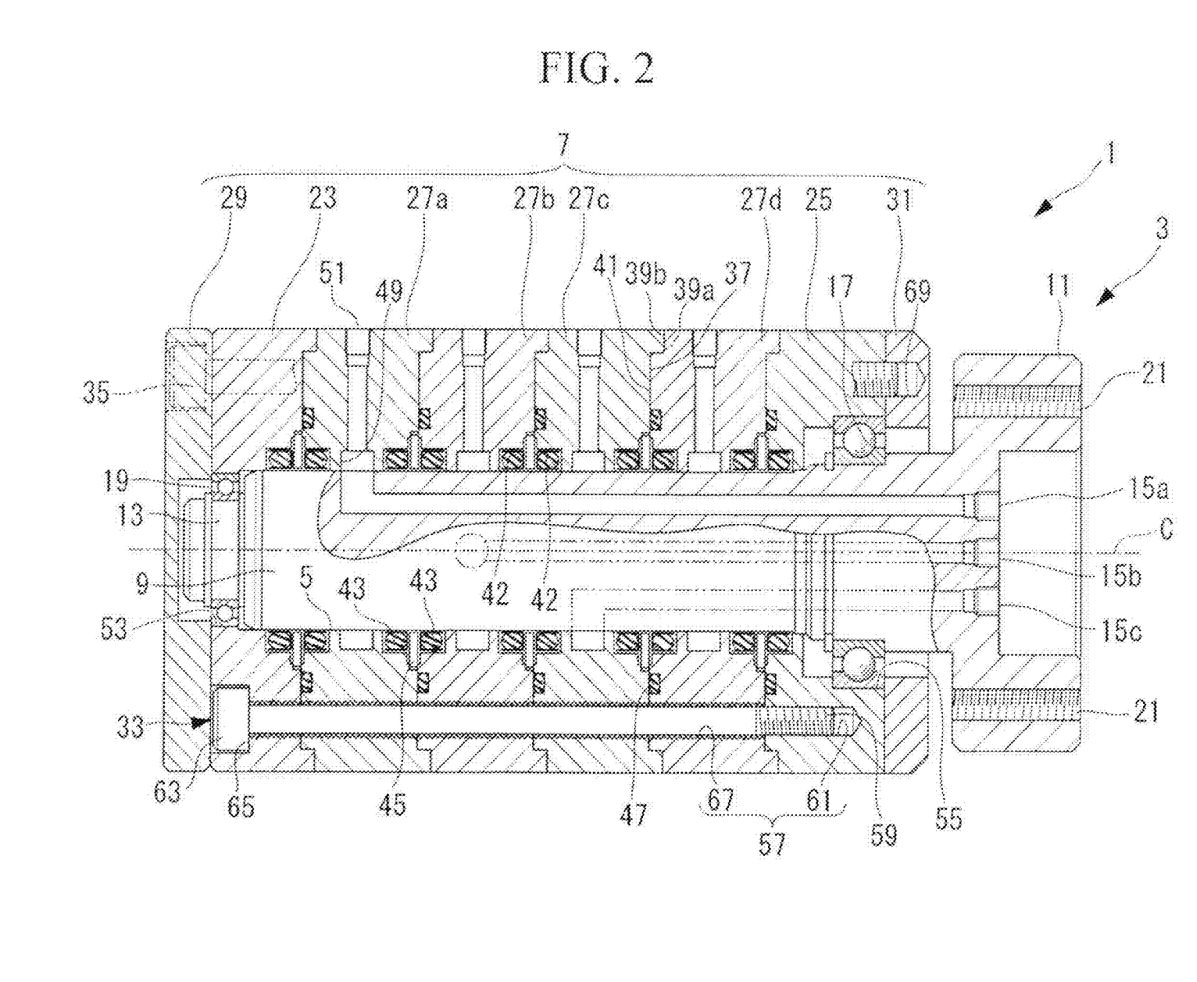
FIG. 2 is a diagram of an embodiment of the rotary joint shown in FIG. 1.

FIG. 2 is a sectional view of the rotary joint according to the present invention.

In FIG. 2, the rotary joint 1 mainly includes a substantially cylindrical shaft 3 and a substantially cylindrical housing 7 having an insertion hole 5 where the shaft 3 is inserted. The shaft 3 and the housing 7 are arranged so as to be capable of relative rotation about the central axis of the shaft 3.

The shaft 3 mainly includes a substantially cylindrical shaft portion 9, a flange 11 formed at one end of the shaft portion 9 and having a larger diameter than the shaft portion 9, and a small-diameter portion 13 formed at the other end of the shaft portion 9 and having a smaller diameter than the shaft portion 9. A surface of the shaft portion 9, specifically, at least portions where sealing members described later slide, is coated with ceramic, serving as a wear-resistant material, by spraying. Preferably, the ceramic coating is not formed on a part of the shaft portion 9 where a shaft bearing described later is disposed. The method used for spraying is not particularly limited and can be selected from various known methods.

The shaft 3 is preferably formed of a material with chemical resistance, for example, a metal such as stainless steel, exemplified by SUS316, although the material used is not limited thereto.

Figure 3:
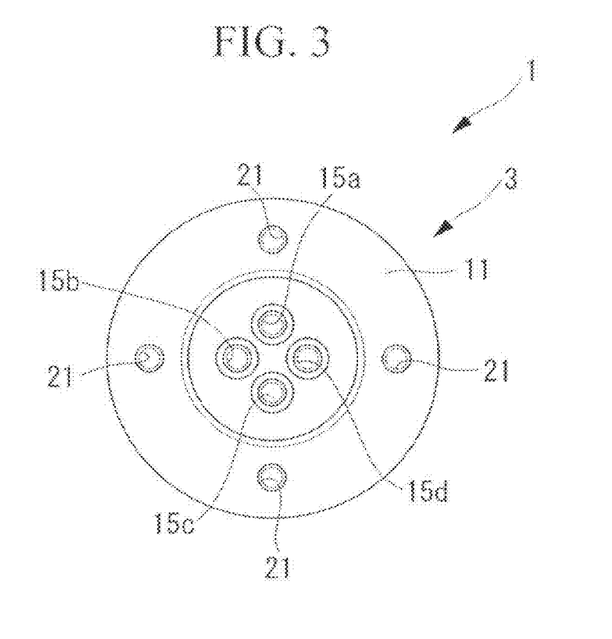
FIG. 3 is a side view of the rotary joint shown in FIG. 2.

FIG. 3 is a side view of the rotary joint shown in FIG. 2.

In FIGS. 2 and 3, four shaft communicating channels (shaft communicating holes) 15a to 15d are formed inside the shaft portion 9. In FIG. 3, the shaft communicating channels 15a to 15d have flange openings in an end surface of the flange 11. These flange openings are arranged at regular intervals on the circumference of the same circle around a central axis C of the shaft 3. In FIG. 2, the shaft communicating channels 15a to 15d extend from the flange openings toward the small-diameter portion 13 along the shaft central axis C.

The shaft communicating channels 15a to 15d are bent substantially perpendicularly at different predetermined positions to communicate with the outside through shaft openings in the side surface of the shaft portion 9. Specifically, the shaft communicating channels 15a to 15d are bent at positions corresponding to housing communicating channels described later.

The shaft 3 has a shaft bearing (rotating support) 17 disposed near the flange 11 of the shaft portion 9 and a small-diameter bearing (rotating support) 19 disposed around the small-diameter portion. These bearings 17 and 19 support the shaft 3 rotatably about the central axis C relative to the housing 7. The small-diameter bearing 19 has a smaller outside diameter than the shaft portion 9.

The flange 11 has connection screw holes 21 connected to the polishing pad 109 (see FIG. 1). These connection screw holes 21 are used to connect the flange 11 and the polishing pad 109.

In FIG. 2, the housing 7 includes segments arranged in a line, that is, a front segment (housing segment) 23 disposed at one end, a rear segment (housing segment) 25 disposed at the other end, and housing segments 27a to 27d disposed therebetween. The front segment 23 has a front cover 29, and the rear segment 25 has a rear cover 31.

The housing 7 also includes a first through-bolt (fastening member) 33 integrally fixing the front segment 23, the housing segments 27a to 27d, and the rear segment 25 and a second through-bolt (fastening member) 35 integrally fixing the front cover 29, the front segment 23, the housing segments 27a to 27d, the rear segment 25, and the rear cover 31.

The shaft 3 is inserted in the insertion hole 5 of the housing 7. The insertion hole 5 extends through the front segment 23, the housing segments 27a to 27d, the rear segment 25, and the rear cover 31.

Annular centering protrusions (centering means or protrusions) 39a sharing the central axis C with the insertion hole 5 are formed in the vicinities of the outer rims of rear contact surfaces (opposing surfaces) 37, facing the rear segment 25, of the housing segments 27a to 27d and the front segment 23.

On the other hand, annular centering recesses (centering means or recesses) 39b sharing the central axis C with the insertion hole 5 are formed in the vicinities of the outer rims of front contact surfaces (opposing surfaces) 41, facing the front segment 23, of the housing segments 27a to 27d and the rear segment 25.

The centering protrusions 39a and the centering recesses 39b are formed so that they can be fitted to each other. The centering protrusions 39a and the centering recesses 39b can be lined to each other to align the central axes of the insertion hole 5 formed in the housing segments 27a to 27d, the front segment 23, and the rear segment 25 within a predetermined tolerance.

The central axis of the insertion hole 5 can be aligned using the centering protrusions 39a and the centering recesses 39b, as described above, or using, for example, positioning pins.

Annular steps 42 are formed in the vicinities of the inner rims of the rear contact surfaces 37 of the housing segments 27a to 27d and the front segment 23 and the front contact surfaces 41 of the housing segments 27a to 27d and the rear segment 25. The sealing members described below are disposed on the steps 42.

Holding portions for holding reinforcing members described below are formed outside the steps 42 in the radial direction thereof.

Annular sealing members (leakage-preventing members) 43 each include a jacket that is substantially U-shaped in cross section and has an opening oriented in the central-axis direction of the insertion hole 5 and a coil-shaped spring accommodated in the jacket. The jacket is preferably formed of resin material having chemical resistance, fluid sealability, and wear resistance, for example, polytetrafluoroethylene (PTFE) that has increased wear resistance by adding, for example, graphite, carbon fiber, or glass fiber. The inner spring biases the jacket, thereby widening and pressing the jacket against the shaft 3 and the steps 42.

The sealing members 43 are disposed between the steps 42 and the shaft 3. The openings of the jackets of the sealing members 43 disposed on the housing segments 27a to 27d face annular grooves, which are to be described later. The openings of the jackets of the sealing members 43 disposed on the front segment 23 and the rear segment 25 face away from the housing segments 27a to 27d. That is, the adjacent sealing members 43 are arranged such that they openings thereof face away from each other. Annular reinforcing members 45 are disposed between the sealing members 43. These reinforcing members 45 are disposed in contact with the jackets of the adjacent sealing members 43 to prevent movement thereof.

Annular grooves for accommodating O-rings described below are formed between the centering recesses 39b and the steps 42 in the front contact surfaces 41 of the housing segments 27a to 27d and the rear segment 25. Annular leakage-preventing members, namely, O-rings 47, are disposed in the grooves. The O-rings 47 are disposed in contact with both the grooves and the opposite rear contact surfaces 37. The O-rings 47 can prevent leakage of fluid and entry of outside air from between the front contact surfaces 41 and the rear contact surfaces 37.

Although the O-rings 47 can be provided in the grooves, any other type of members capable of preventing leakage can be used.

Annular grooves 49 are formed about the central axis C of the insertion hole 5 between the steps 42 in the inner circumferential surface of the insertion hole 5 of the housing segments 27a to 27d. The annular grooves 49 communicate with the outside of the housing 7 via housing communicating channels (housing communicating holes) 51 formed in the housing segments 27a to 27d. The annular grooves 49 are disposed at positions where they can communicate with the shaft openings of the shaft communicating channels 15a to 15d.

The front segment 23 has a front supporting portion 53 supporting an outer ring of the small-diameter bearing 19. The front supporting portion 53 is an annular protrusion formed on the inner circumferential surface of the insertion hole 5.

The rear segment 25 has a rear supporting portion 55 supporting an outer ring of the shaft bearing 17. The rear supporting portion 55 is an annular groove formed in the inner circumferential surface of the insertion hole 5.

The front supporting portion 53 and the rear supporting portion 55 are formed such that the central axes thereof coincide with the central axis C of the insertion hole 5. The small-diameter bearing 19 and the shaft bearing 17 can be brought into and out of contact with the front supporting portion 53 and the rear supporting portion 55, respectively, and are not fixed thereto.

A first through-bolt hole (fastening member hole) 57 where the first through-bolt 33 is inserted is formed in the front segment 23 and the housing segments 27a to 27d. The rear segment 25 has a female threaded portion (retaining portion) 61 in threaded engagement with a male threaded portion 59 of the first through-bolt 33. The front segment 23 has a countersunk portion accommodating a head portion 63 of the first through-bolt 33. The head portion 63 is in contact with the bottom surface of the countersunk portion, namely, a seating surface (retaining portion) 65.

A female threaded hole portion 67 formed in the inner circumferential surface of the first through-bolt hole 57 has an inside diameter larger than the outside diameter of the male threaded portion 59. This relationship is satisfied if, for example, the male threaded portion 59 is an M6 male screw and the female threaded hole portion 67 is an M8 female screw.

Similarly, a second through-bolt hole 69 where the second through-bolt 35 is inserted is formed in the front cover 29, the front segment, the housing segments 27a to 27d, and the rear cover 31. The rear cover 31 has a female threaded portion 61 in threaded engagement with a male threaded portion 59 of the second through-bolt 35.

An attachment hole (not shown) for attachment of a member for limiting rotation of the housing 7 is formed in the outer side surface of the housing segment 27d. A rotation-limiting member (not shown) can be attached to the attachment hole to limit the rotation of the housing 7. The attachment hole can be formed on the housing segment 27d, as described above, or on any of the other housing segments 27a to 27c, the front segment, and the rear segment 25.

Next, the operation of the rotary joint 1 having the above structure will be described.

In FIGS. 1 and 2, the shaft 3 of the rotary joint 1 is connected to the pad-supporting section 105 and is rotated with the housing 7 being fixed by the rotation-limiting member. The rotational speed of the shaft 3 can be, for example, about 100 to 200 rpm, although it depends on the usage conditions of the CMP apparatus 101.

In this state, the supply and drainage unit 111 and the air supply unit 113 supply chemical solutions and air, for example, to the rotary joint 1. The supplied chemical solutions and air flow into the pad-supporting section 105 through the housing communicating channels 51, the annular grooves 49, and the shaft communicating channels 15a to 15d and are used to polish the wafer 107. The supply pressure of the chemical solutions and air falls within the range of, for example, about −100 to 250 kPa, although it depends on the usage conditions of the CMP apparatus 101. A negative supply pressure causes suction of the chemical solutions and air.

While most of the chemical solutions and air entering the annular grooves 49 flows into the shaft communicating channels 15a to 15d, part of the chemical solutions and air flows into a gap between the shaft 3 and the insertion hole 5. The chemical solutions and air flowing into the gap are blocked by the sealing members 43 disposed on the steps 42, specifically, by contact portions of the jackets of the sealing members 43 and the steps 42 and contact portions of the jackets of the sealing members 43 and the shaft 3. The jackets are widened by the pressure of the chemical solutions and air and are pressed against the steps 42 and the shaft 3 at increased contact pressure to provide increased sealability.

Although the pressure of the chemical solutions and air tends to push the sealing members 43, the reinforcing members 45 support the sealing members 43 to prevent movement thereof.

If the supply pressure of the chemical solutions and air is negative, the sealing members 43 adjacent to the reinforcing members 45 prevent other chemical solutions and air from flowing into the annular grooves with negative pressure, and the O-rings 47 prevent entry of outside air.

The sealing members 43 adjacent to the annular grooves with negative pressure exhibit decreased sealability because a pressure difference between the sealing member 43 side and the annular groove 49 side produces a force tending to close the openings of the jackets. Conversely, the sealing members 43 adjacent to the reinforcing members exhibit increased sealability because they experience a force tending to open the openings of the jackets.

Next, a method for changing the number of chemical solutions, for example, that can be used for the rotary joint 1 will be described.

First, the second through-bolt 35 is removed to detach the front cover 29 from the housing 7, and the first through-bolt 33 is removed from the housing 7.

The front segment 23, housing segments 27a to 27d, and rear segment 25 of the housing 7 are sequentially detached from the small-diameter portion 13 side of the shaft 3. Thus, the shaft 3 is removed.

Figure 4:
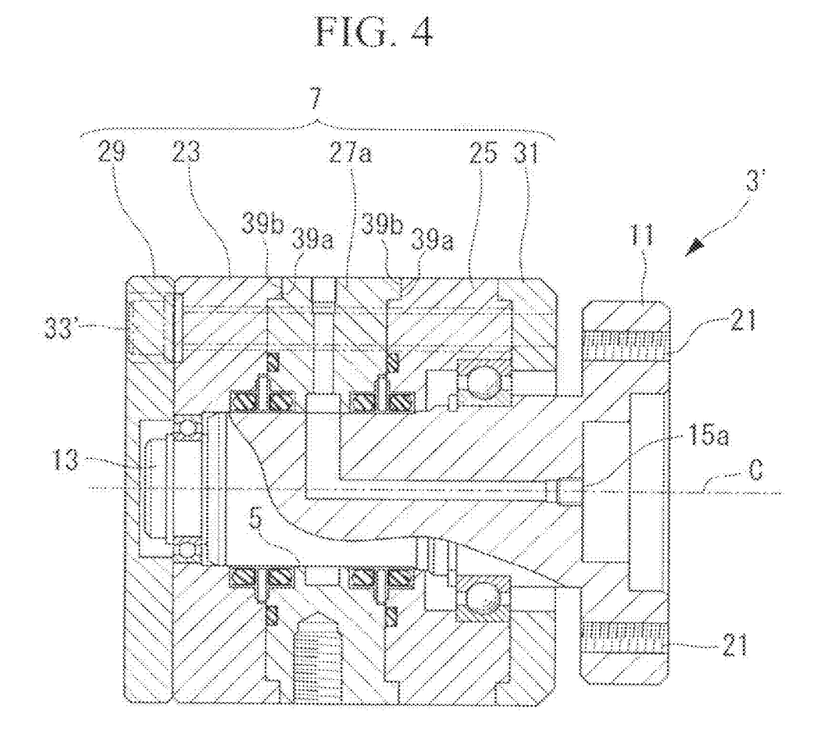
FIG. 4 is a diagram of a modification of the rotary joint shown in FIG. 2 for the case where a single chemical solution is used.
Figure 5:
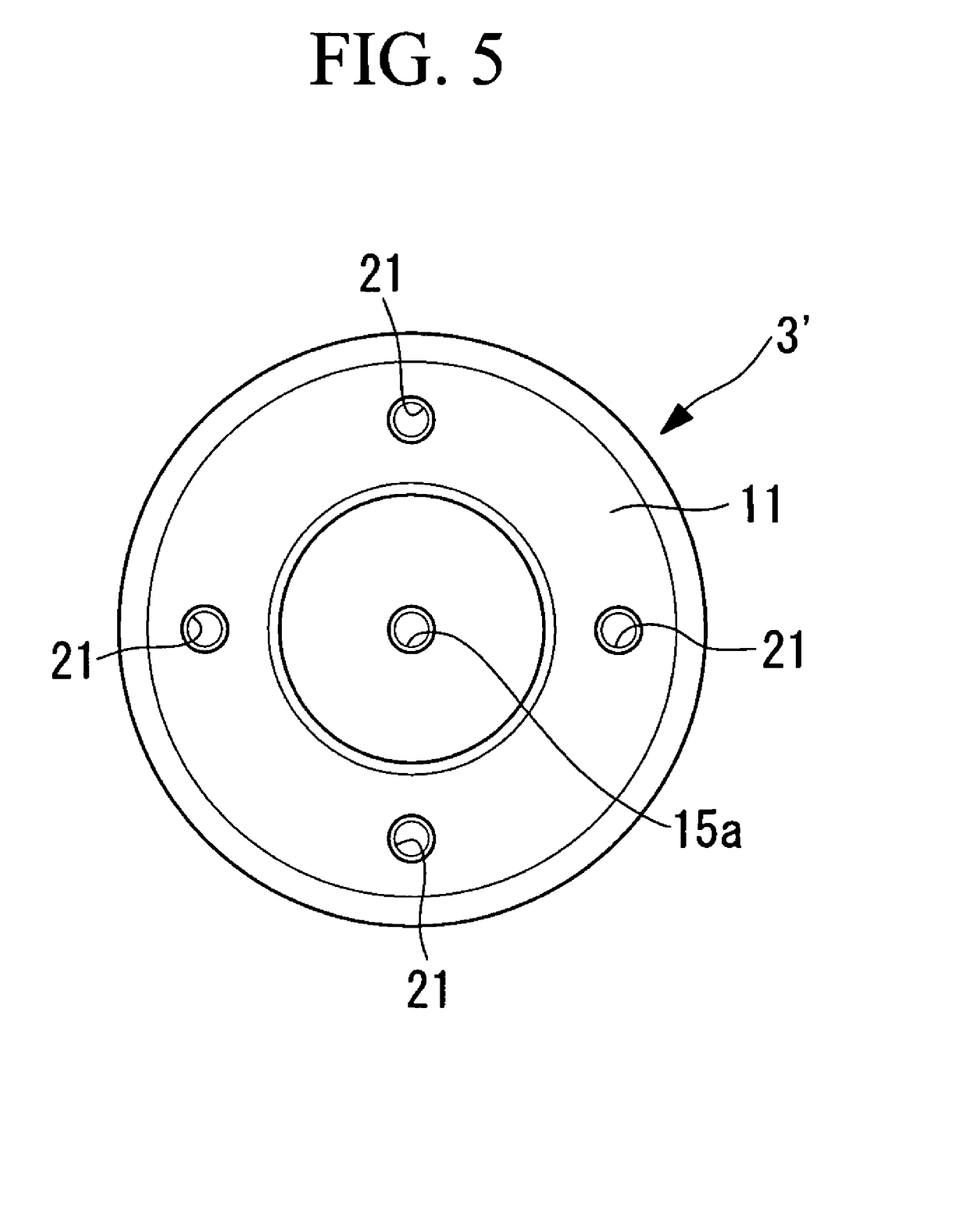
FIG. 5 is a side view of the rotary joint shown in FIG. 4.

FIG. 4 is a diagram of a modification of the rotary joint 1 shown in FIG. 2 for the case where a single chemical solution is used. FIG. 5 is a side view of the rotary joint shown in FIG. 4.

When the number of chemical solutions used is changed, only the shaft 3 is replaced because the number of shaft communicating channels formed in the shaft 3 and the length of the shaft 3 cannot be changed. The description below will be given of the case where a single chemical solution is used, as shown in FIGS. 4 and 5. Accordingly, the shaft 3 is replaced with an alternative shaft 3' having only the shaft communicating channel 15a.

The rear segment 25, the housing segment 27a, and the front segment 23 are sequentially attached to the shaft 3' through the small-diameter portion 13 thereof.

The relative positions of the front segment 23 and the housing segment 27a and those of the housing segment 27a and the rear segment 25 are aligned by fitting the centering protrusions 39a to the centering recesses 39b. The segments 23, 27a, and 25 are therefore joined so that the central axes of the insertion holes 5 formed in the segments 23, 27a, and 25 are substantially aligned to each other.

The front segment 23, the housing segment 27a, and the rear segment 25 are integrally fastened using a first through-bolt (fastening member) 33'. The first through-bolt 33' allows the individual segments to be integrally fastened without misalignment of the central axis of the insertion hole 5.

In maintenance of the rotary joint 1, for example, in replacement of the sealing members 43, the front segment 23 and the housing segments 27a to 27d are detached from the small-diameter portion 13 side of the shaft 3 to replace the sealing members 43 from the small-diameter portion 13 side.

If a slurry is used as a chemical solution, the segments can become difficult to separate. If, for example, the housing segments 27a and 27b are difficult to separate, the phases of the housing segments 27a and 27b in the circumferential direction are shifted from each other so that the first through-bolt hole 57 becomes misaligned in the housing segments 27a and 27b.

A bolt (M8 bolt (JIS)) is then screwed into the female threaded hole portion 67 from the housing segment 27a. A leading end of the bolt is brought into contact with the housing segment 27b and is pressed thereagainst, so that the housing segments 27a and 27b can be separated.

According to the above structure, the number of chemical solutions, for example, that can be communicated without being mixed with each other can be changed by changing the number of housing segments and replacing the shaft 3 with one corresponding to the number of housing segments.

For example, the number of chemical solutions can be decreased by replacing the shaft 3 with one corresponding to the decreased number of chemical solutions and removing unnecessary housing segments from the rotary joint 1. The number of chemical solutions can also be increased by replacing the shaft 3 with one corresponding to the increased number of housing segments and adding necessary housing segments to the rotary joint 1.

This method can be employed at a lower cost than replacement of the entire rotary joint 1 because the method requires only an alternative shaft, or only an alternative shaft and additional housing segments.

Because the number of chemical solutions is changed by changing the number of housing segments, the shapes thereof do not have to be changed. In comparison with the use of dedicated housings corresponding to the number of chemical solutions, the above method contributes to a simplified production process and a reduction in lead time, cost, and storage space because only housing segments of the same shapes are produced.

The centering protrusions 39a and the centering recesses 39b can be used to easily align the central axis C of the insertion hole 5 formed in the housing segments. This prevents formation of steps in the inner circumferential surface of the insertion hole 5 due to misalignment of the housing segments, thus suppressing variations in the distance between the shaft 3 and the insertion hole 5.

The use of the centering protrusions 39a and the centering recesses 39b can therefore suppress variations in the surface pressure of the contact portions of the shaft 3 and the sealing members 43 to prevent further wear of the shaft 3 and the sealing members 43. This avoids leakage of the chemical solutions communicated between the shaft communicating channels 15a to 15d and the housing communicating channels 51.

The centering protrusions 39a and the centering recesses 39b can be formed simultaneously when the housing segments are formed, particularly, when the insertion hole 5 is formed. Accordingly, the central axes of the centering protrusions 39a and the centering recesses 39b can be aligned to the central axis C of the insertion hole 5 with high accuracy, thus further suppressing variations in the distance between the shaft 3 and the insertion hole 5.

Specifically, the centering protrusions 39a and the centering recesses 39b can be formed in the same step as the formation of the insertion hole 5 without detaching the housing segments from a retaining jig (chuck), thus achieving high relative positional accuracy.

Because the small-diameter bearing 19 and the shaft bearing 17 are disposed on the shaft 3, the shaft 3 and the housing segments can be disassembled and assembled without impairing the relative positional accuracy of the central axes of the shaft 3 and the insertion hole 5.

That is, the relative positional accuracy of the central axes of the shaft 3 and the insertion hole 5 can more easily be ensured in the case where the outer rings of the bearings are detachable from the housing 7 than in the case where the inner rings of the bearings are detachable from the shaft 3.

The small-diameter bearing 19 disposed on the small-diameter portion 13 of the shaft 3 has a smaller outside diameter than the shaft portion 9 of the shaft 3. The housing segments can therefore be disassembled and assembled without detaching the small-diameter bearing 19 from the shaft 3. Accordingly, the small-diameter bearing 19 can be tightly fitted to the shaft 3 to prevent impairment of the relative positional accuracy of the central axes of the shaft 3 and the insertion hole 5.

The small-diameter bearing 19, which is tightly fitted to the shaft 3, does not have to be detached therefrom. This structure eliminates the risk of damage to the small-diameter bearing 19 since it is not necessary to detach the small-diameter bearing 19 from the shaft 3 and reattach the small-diameter hearing 19 to the shaft 3, thus preventing impairment of the relative positional accuracy of the central axes of the shaft 3 and the insertion hole 5. This avoids leakage of chemical solutions and a decrease in the service life of the rotary joint 1.

The above structure also eliminates the need to use a jig for detaching the small-diameter bearing 19 in maintenance and a fitting jig for retaining the inner ring of the small-diameter bearing 19 in reassembly, thus facilitating on-site maintenance.

Because the small-diameter bearing 19 disposed on the small-diameter portion 13 of the shaft 3 has a smaller outside diameter than the shaft portion 9 of the shaft 3, the sealing members 43 can be detached from the small-diameter portion 13 side without detaching the small-diameter bearing 19 from the shaft 3. This structure eliminates the need to detach the small-diameter bearing 19 and the shaft bearing 17 from the shaft 3 when, for example, degraded or worn sealing members 43 are replaced or the number of housing segments is changed. This prevents impairment of the relative positional accuracy of the central axes of the shaft 3 and the insertion hole 5.

The ceramic coating can prevent wear of the shaft 3 when it slides over the sealing members 43. The coating can therefore prevent a decrease in the pressure of the contact surfaces of the shaft 3 and the sealing members 43 and separation of the shaft 3 and the sealing members 43. This avoids leakage of the chemical solutions communicated between the shaft communicating channels 15a to 15d and the housing communicating channels 51.

The ceramic coating is formed on the side surface of the shaft 3 by spraying. Using the ceramic coating, the shaft 3 can be more easily produced in comparison with, for example, the use of a ceramic cylinder for covering the shaft 3. This contributes to a reduction in production costs.

The technical scope of the present invention is not limited to the above embodiment; various modifications are permitted without departing from the spirit of the present invention.

For example, although the rotary joint according to the above embodiment is applied to a CMP apparatus, the invention is not limited to application to CMP apparatuses and can be applied to various apparatuses having a rotary joint.

The invention claimed is:

1. A rotary joint comprising:
   a substantially cylindrical shaft;
   a shaft communicating hole formed in the shaft and having an opening in a side surface thereof;
   a housing having an insertion hole where the shaft is inserted so as to be capable of relative rotation;
   a plurality of housing segments formed by dividing the housing and arranged in a central-axis direction of the shaft;
   a housing communicating hole formed in at least one housing segment among the plurality of housing segments, so that the shaft communicating hole communicates with the outside of the housing via the housing communicating hole in the at least one housing segment;
   an annular groove formed in at least one of the side surface of the shaft and an inner circumferential surface of the insertion hole so that the shaft communicating hole communicates with the housing communicating hole via the annular groove; and
   an annular leakage-preventing member disposed between the shaft and the housing to block fluid movement in the central-axis direction
   wherein the shaft includes a substantially cylindrical shaft portion, and a small-diameter portion formed at one end of the shaft and having a smaller diameter than the shaft portion;
   at least one pair of rotating supports supporting the shaft and the housing in such a manner as to be capable of relative rotation about the central axis, being provided on the shaft;
   one of the rotating supports being disposed at the small-diameter portion; and
   wherein an outside diameter of the one of the rotating supports is smaller than an outside diameter of the shaft and is smaller than inside diameters of the plurality of housing segments.

2. The rotary joint according to claim 1, further comprising centering means disposed on opposing surfaces of two of the housing segments to align the central axes of the insertion holes formed in the two housing segments.

3. The rotary joint according to claim 2, wherein the centering means comprises:
   an annular protrusion formed about the central axis on the opposing surface of one of the two housing segments; and
   an annular recess formed about the central axis in the opposing surface of the other housing segment and fitted to the annular protrusion.

4. The rotary joint according to claim 1, wherein
   the housing includes the plurality of housing segments, which are arranged in a line, and a fastening member integrally fastening the plurality of housing segments;
   each of a pair of the housing segments disposed at both ends of the housing has a retaining portion retaining the fastening member; and
   each of the housing segments disposed between the pair of housing segments has a fastening member hole where the fastening member is inserted.

5. The rotary joint according to claim 4, wherein
   the fastening member is a bolt having a male threaded portion in at least a tip region of an end of the bolt and a head portion at the other end of the bolt;
   the retaining portion of one of the pair of housing segments is a retaining female threaded portion in threaded engagement with the male threaded portion; and
   the retaining portion of the other housing segment is a seating surface in contact with the head portion.

6. The rotary joint according to claim 5, wherein a female threaded hole portion is formed on an inner circumferential surface of the fastening member hole, the female threaded hole portion having an inside diameter larger than the outside diameter of the male threaded portion.

7. The rotary joint according to claim 1, wherein
the leakage-preventing member is fixed to the housing; and
the shaft has a wear-resistant coating in at least a region of the side surface of the shaft where the leakage-preventing member slides.

8. The rotary joint according to claim 1, wherein
the leakage-preventing member is a pair of sealing members that are substantially U-shaped in cross section;
the pair of sealing members are arranged in the central-axis direction with joint surfaces of the housing segments disposed therebetween such that substantially U-shaped openings face away from each other in the central-axis direction; and
an annular reinforcing member is disposed between the sealing members.

9. A rotary joint comprising:
a substantially cylindrical shaft;
a shaft communicating hole formed in the shaft and having an opening in a side surface thereof;
a housing having an insertion hole where the shaft is inserted so as to be capable of relative rotation;
a plurality of housing segments formed by dividing the housing and arranged in a central-axis direction of the shaft;
a housing communicating hole formed in at least one housing segment among the plurality of housing segments, so that the shaft communicating hole communicates with the outside of the housing via the housing communicating hole in the at least one housing segment;
an annular groove formed in at least one of the side surface of the shaft and an inner circumferential surface of the insertion hole so that the shaft communicating hole communicates with the housing communicating hole via the annular groove; and
an annular leakage-preventing member disposed between the shaft and the housing to block fluid movement in the central-axis direction;
wherein
the housing includes the plurality of housing segments, which are arranged in a line, and a fastening member integrally fastening the plurality of housing segments;
each of a pair of the housing segments disposed at both ends of the housing has a retaining portion retaining the fastening member; and
each of the housing segments disposed between the pair of housing segments has a fastening member hole where the fastening member is inserted;
wherein the fastening member is a bolt having a male threaded portion in at least a tip region of an end of the bolt and a head portion at the other end of the bolt;
the retaining portion of each of the pair of housing segments is a retaining female threaded portion in threaded engagement with the male threaded portion;
wherein a female threaded portion is formed on an inner circumferential surface of the fastening member hole, the female threaded hole portion having an inside diameter larger than the outside diameter of the male threaded portion.

* * * * *